US012665224B2

(12) United States Patent　　(10) Patent No.:　US 12,665,224 B2
Sakitani et al.　　　　　　　　　 (45) Date of Patent:　　Jun. 23, 2026

(54) NON-AQUEOUS ELECTROLYTE SECONDARY BATTERY AND METHOD FOR PRODUCING NON-AQUEOUS ELECTROLYTE SECONDARY BATTERY

(71) Applicant: SANYO Electric Co., Ltd., Daito (JP)

(72) Inventors: Nobuhiro Sakitani, Tokushima (JP); Takaharu Morikawa, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 787 days.

(21) Appl. No.: 17/636,589

(22) PCT Filed: Aug. 18, 2020

(86) PCT No.: PCT/JP2020/031042
　　§ 371 (c)(1),
　　(2) Date: Feb. 18, 2022

(87) PCT Pub. No.: WO2021/039481
　　PCT Pub. Date: Mar. 4, 2021

(65) Prior Publication Data
　　US 2022/0302508 A1　　Sep. 22, 2022

(30) Foreign Application Priority Data

Aug. 28, 2019　　(JP) ................................. 2019-155369

(51) Int. Cl.
　　*H01M 10/0587*　　(2010.01)
　　*H01M 4/62*　　　　(2006.01)
(52) U.S. Cl.
　　CPC ....... *H01M 10/0587* (2013.01); *H01M 4/621* (2013.01)
(58) Field of Classification Search
　　CPC .......... H01M 4/621; H01M 4/62; H01M 4/04; H01M 10/058
　　See application file for complete search history.

(56) References Cited

U.S. PATENT DOCUMENTS

2011/0123866 A1*　5/2011　Pan ....................... H01M 4/525
　　　　　　　　　　　　　　　　　　　　　　　427/458
2012/0258343 A1　10/2012　Takahata et al.
　　　　　　　　　(Continued)

FOREIGN PATENT DOCUMENTS

JP　　　　8-17472 A　　1/1996
JP　　2011-165388 A　　8/2011
　　　　　(Continued)

OTHER PUBLICATIONS

Extended (Supplementary) European Search Report dated Jan. 31, 2023, issued in counterpart EP Application No. 20856766.9. (9 pages).

(Continued)

*Primary Examiner* — Kenneth J Douyette
(74) *Attorney, Agent, or Firm* — WHDA, LLP

(57)　　　　ABSTRACT

The non-aqueous electrolyte secondary battery according to an aspect of the present disclosure comprises: a wound electrode body on which a strip-like positive electrode and a strip-like negative electrode are each wound with a separator interposed therebetween; and an outer package accommodating the electrode body. The positive electrode comprises a positive current collector and a positive mixture layer that is formed on the positive current collector and contains at least a positive active material and a binder. The negative electrode comprises a negative current collector and a negative mixture layer that is formed on the negative current collector and contains at least a negative active material and a binder. At least one of the positive mixture layer and the negative mixture layer has a binder content that is higher on a leading end than on a terminal end.

4 Claims, 5 Drawing Sheets

(56)     References Cited

U.S. PATENT DOCUMENTS

| | | | | |
|---|---|---|---|---|
| 2012/0328942 | A1* | 12/2012 | Thomas-Alyea ..... | H01M 4/587 |
| | | | | 429/211 |
| 2014/0023927 | A1* | 1/2014 | Park ................... | H01M 4/0471 |
| | | | | 427/58 |
| 2016/0334244 | A1 | 11/2016 | Haraguchi et al. | |

FOREIGN PATENT DOCUMENTS

| | | | |
|---|---|---|---|
| JP | 2012-043592 | A | 3/2012 |
| JP | 2013-171806 | A | 9/2013 |
| WO | 2015/115054 | A1 | 8/2015 |

OTHER PUBLICATIONS

International Search Report dated Oct. 13, 2020, issued in counterpart International Application No. PCT/JP2020/031042 (2 pages).

* cited by examiner

Figure 3

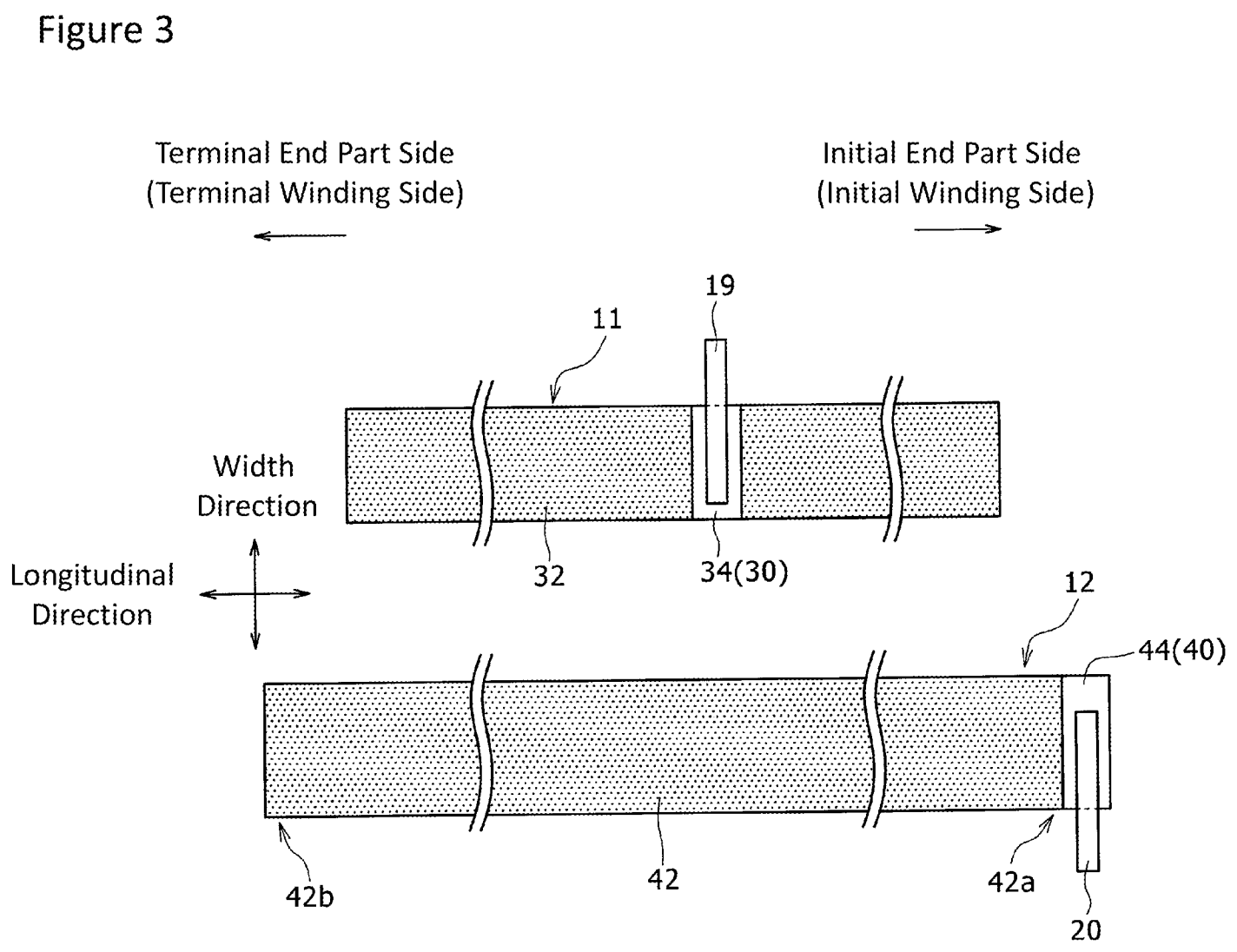

Terminal End Part Side
(Terminal Winding Side)

Initial End Part Side
(Initial Winding Side)

19

11

34(30)

32

12

44(40)

42a

20

42

42b

Width
Direction

Longitudinal
Direction

Figure 4(a)

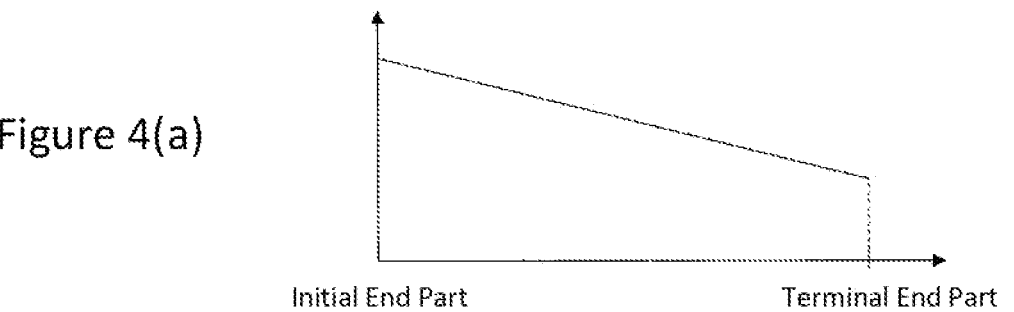

Content Rate of Binder in Negative Electrode Mixture Layer

Initial End Part          Terminal End Part

Figure 4(b)

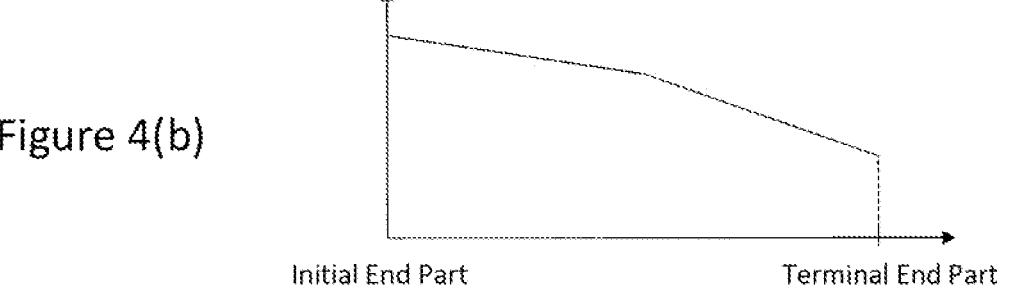

Content Rate of Binder in Negative Electrode Mixture Layer

Initial End Part          Terminal End Part

Figure 4(c)

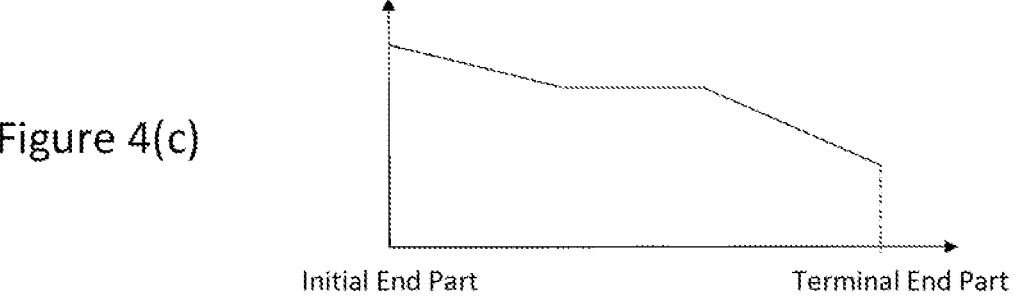

Content Rate of Binder in Negative Electrode Mixture Layer

Initial End Part          Terminal End Part

Figure 4(d)

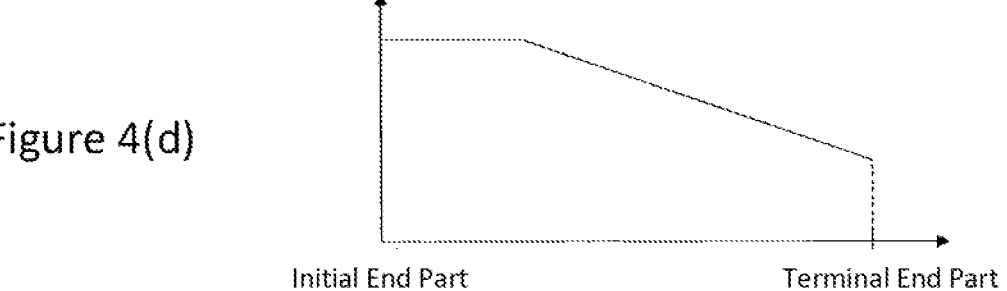

Content Rate of Binder in Negative Electrode Mixture Layer

Initial End Part          Terminal End Part

NON-AQUEOUS ELECTROLYTE SECONDARY BATTERY AND METHOD FOR PRODUCING NON-AQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2020/031042 filed on Aug. 18, 2020 which claims the benefit of priorities under 35 U.S.C. § 119 (a) of Japanese Patent Application No. 2019-155369 filed in Japan on Aug. 28, 2019, the contents of which are incorporated herein by reference.

TECHNICAL FIELD

The present disclosure generally relates to a non-aqueous electrolyte secondary battery and a method of manufacturing a non-aqueous electrolyte secondary battery.

BACKGROUND ART

Conventionally widely used is a non-aqueous electrolyte secondary battery comprising a wound electrode assembly in which a band-shaped positive electrode and a band-shaped negative electrode are wound with a separator interposed therebetween and an exterior housing body that houses the wound electrode assembly. The electrodes in the electrode assembly (the positive electrode and the negative electrode) have a mixture layer including an active material and a binder on both surfaces of each metallic current collector. Unfortunately, by winding of the electrodes, cracking may occur on the mixture layer or the mixture layer may be peeled from the current collector. Patent Literature 1 discloses a method of preventing peeling of a mixture layer on the inner peripheral side of a current collector by increasing a content rate of a binder included in the mixture layer on the inner peripheral side of the current collector.

CITATION LIST

Patent Literature

PATENT LITERATURE 1: Japanese Unexamined Patent Application Publication No. Hei8-17472

SUMMARY

Technical Problem

The art disclosed in Patent Literature 1, however, may not sufficiently prevent cracking and peeling of the mixture layer on an initial end part positioned on an initial winding side of the electrode assembly in which the positive electrode and the negative electrode are wound with a small curvature radius. Increasing the content of the binder to prevent the cracking and peeling of the mixture layer causes a problem of increase in the internal resistance of the battery to deteriorate battery characteristics.

An object of the present disclosure is to provide a non-aqueous electrolyte secondary battery in which an increase in the internal resistance of the battery due to the binder included in the mixture layer is prevented and the cracking and peeling of the mixture layer are prevented.

Solution to Problem

The non-aqueous electrolyte secondary battery of an aspect of the present disclosure is a non-aqueous electrolyte secondary battery, comprising: a wound electrode assembly in which a band-shaped positive electrode and a band-shaped negative electrode are wound with a separator interposed therebetween; and an exterior housing body that houses the electrode assembly. The positive electrode has: a positive electrode current collector; and a positive electrode mixture layer formed on the positive electrode current collector and including at least a positive electrode active material and a binder; the negative electrode has: a negative electrode current collector; and a negative electrode mixture layer formed on the negative electrode current collector and including at least a negative electrode active material and a binder; and at least one of the positive electrode mixture layer and the negative electrode mixture layer has a higher content rate of the binder in an initial end part than a content rate of the binder in a terminal end part.

The method of manufacturing a non-aqueous electrolyte secondary battery of an aspect of the present disclosure is a method of manufacturing a non-aqueous electrolyte secondary battery comprising: a wound electrode assembly in which a band-shaped positive electrode and a band-shaped negative electrode are wound with a separator interposed therebetween; and an exterior housing body that houses the electrode assembly. The method includes: a positive electrode mixture layer forming step of forming a positive electrode mixture layer including at least a positive electrode active material and a binder on a positive electrode current collector of the positive electrode; and a negative electrode mixture layer forming step of forming a negative electrode mixture layer including at least a negative electrode active material and a binder on a negative electrode current collector of the negative electrode, wherein in at least one of the positive electrode mixture layer forming step and the negative electrode mixture layer forming step, a plurality of mixture slurries having different content rates of the binder is applied with changing a ratio of amounts of the plurality of mixture slurries applied from one of an initial end part side and a terminal end part side to the other.

Advantageous Effect of Invention

The non-aqueous electrolyte secondary battery according to the present disclosure can prevent the increase in the internal resistance of the battery due to the binder included in the mixture layer and can prevent the cracking and peeling of the mixture layer.

BRIEF DESCRIPTION OF DRAWINGS

FIG. 3 is a front view illustrating the positive electrode and negative electrode constituting the electrode assembly of an example of an embodiment with an unwound state.

FIGS. 4(a) to 4(d) are graphs indicating a change in the content rate of the binder included in the negative electrode mixture layer in the longitudinal direction in FIG. 3.

DESCRIPTION OF EMBODIMENTS

Hereinafter, an example of an embodiment of a cylindrical secondary battery according to the present disclosure will be described in detail with reference to the drawings. In the following description, specific shapes, materials, values, directions, and the like, which are examples for facilitating understanding of the present invention, may be appropriately modified with specifications of cylindrical secondary batteries. When a plurality of embodiments and modified examples are included in the following description, use in appropriate combination of characteristic portions thereof are anticipated in advance.

Figure 1:
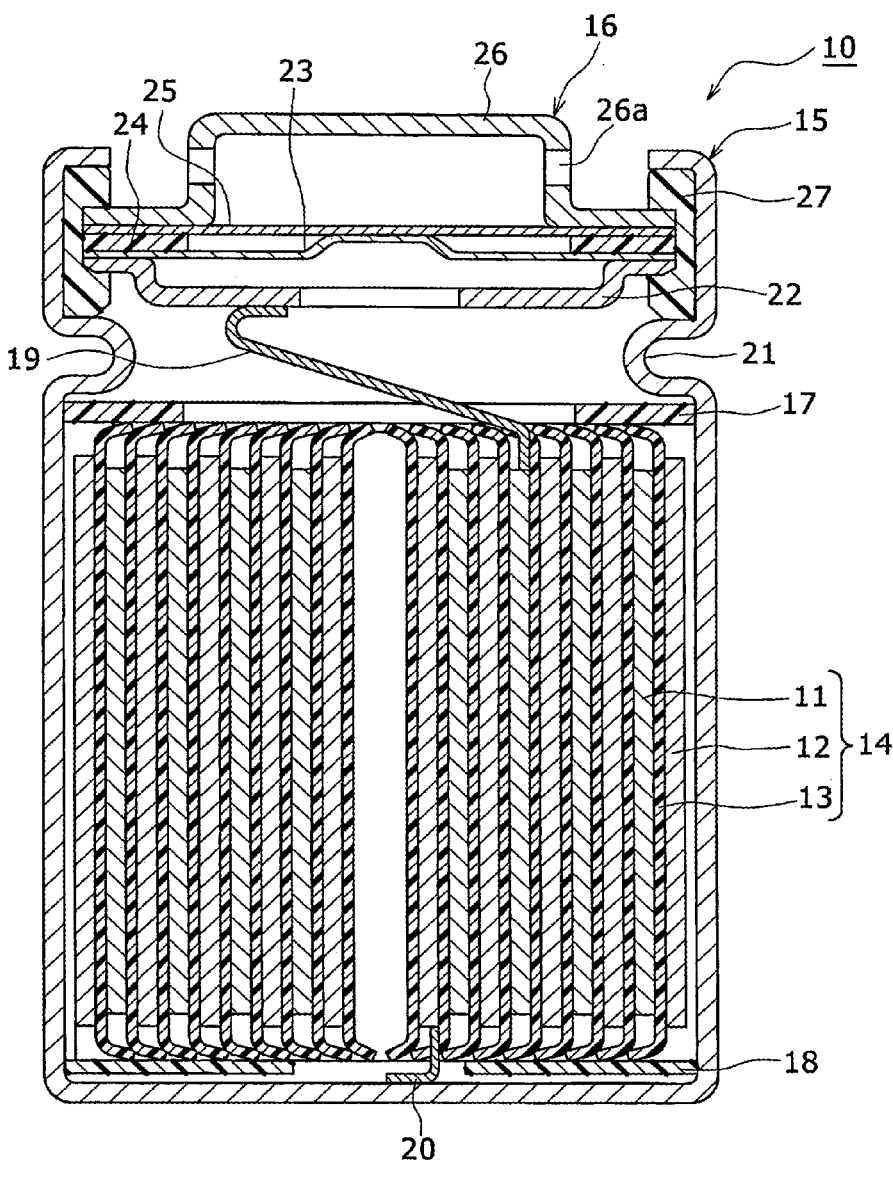
FIG. 1 is an axial sectional view of a cylindrical secondary battery of an example of an embodiment.

FIG. 1 is an axial sectional view of a cylindrical secondary battery 10 of an example of an embodiment. In the secondary battery 10 illustrated in FIG. 1, an electrode assembly 14 and a non-aqueous electrolyte (not illustrated) are housed in an exterior housing body 15. The electrode assembly 14 has a wound structure in which a positive electrode 11 and a negative electrode 12 are wound with a separator 13 interposed therebetween. For a non-aqueous solvent of the non-aqueous electrolyte (organic solvent), carbonates, lactones, ethers, ketones, esters, and the like may be used, and two or more of these solvents may be mixed to be used. When two or more of the solvent are mixed to be used, a mixed solvent including a cyclic carbonate and a chain carbonate is preferably used. For example, ethylene carbonate (EC), propylene carbonate (PC), butylene carbonate (BC), and the like may be used as the cyclic carbonate, and dimethyl carbonate (DMC), ethyl methyl carbonate (EMC), diethyl carbonate (DEC), and the like may be used as the chain carbonate. For an electrolyte salt in the non-aqueous electrolyte. $LiPF_6$, $LiBF_4$, $LiCF_3SO_3$, and the like, and a mixture thereof may be used. An amount of the electrolyte salt dissolved in the non-aqueous solvent may be, for example, 0.5 to 2.0 mol/L. Hereinafter, for convenience of description, the sealing assembly 16 side will be described as "the upper side", and the bottom side of the exterior housing body 15 will be described as "the lower side".

An opening end of the exterior housing body 15 is capped with the sealing assembly 16 to seal inside the secondary battery 10. Insulating plates 17 and 18 are provided on the upper and lower sides of the electrode assembly 14, respectively. A positive electrode lead 19 extends upward through a through hole of the insulating plate 17, and welded with the lower face of a filter 22, which is a bottom plate of the sealing assembly 16. In the secondary battery 10, a cap 26, which is a top plate of the sealing assembly 16 electrically connected to the filter 22, becomes a positive electrode terminal. Meanwhile, a negative electrode lead 20 extends through a through hole of the insulating plate 18 toward the bottom side of the exterior housing body 15, and welded with a bottom inner face of the exterior housing body 15. In the secondary battery 10, the exterior housing body 15 becomes a negative electrode terminal. When the negative electrode lead 20 is provided on the terminal end part, the negative electrode lead 20 extends through an outside of the insulating plate 18 toward the bottom side of the exterior housing body 15, and welded with the bottom inner face of the exterior housing body 15.

The exterior housing body 15 is, for example, a bottomed cylindrical metallic exterior housing can. A gasket 27 is provided between the exterior housing body 15 and the sealing assembly 16 to achieve sealability inside the secondary battery 10. The exterior housing body 15 has a grooved part 21 formed by, for example, pressing the side part thereof from the outside to support the sealing assembly 16. The grooved part 21 is preferably formed circularly along the circumferential direction of the exterior housing body 15, and supports the sealing assembly 16 with the upper face of the grooved part 21.

The sealing assembly 16 has a stacked structure of a filter 22, a lower vent member 23, an insulating member 24, an upper vent member 25, and a cap 26 in this order from the electrode assembly 14 side. Each member constituting the sealing assembly 16 has, for example, a disk shape or a ring shape, and each member except for the insulating member 24 is electrically connected each other. The lower vent member 23 and the upper vent member 25 are connected each other at each of central parts thereof, and the insulating member 24 is interposed between each of the circumferential parts of the vent members 23 and 25. If the internal pressure of the battery increases with abnormal heat generation, for example, the lower vent member 23 breaks and the upper vent member 25 expands toward the cap 26 side to be separated from the lower vent member 23, resulting in cutting off of an electrical connection between the both members. If the internal pressure further increases, the upper vent member 25 breaks, and gas is discharged through an opening 26a of the cap 26.

Figure 2:
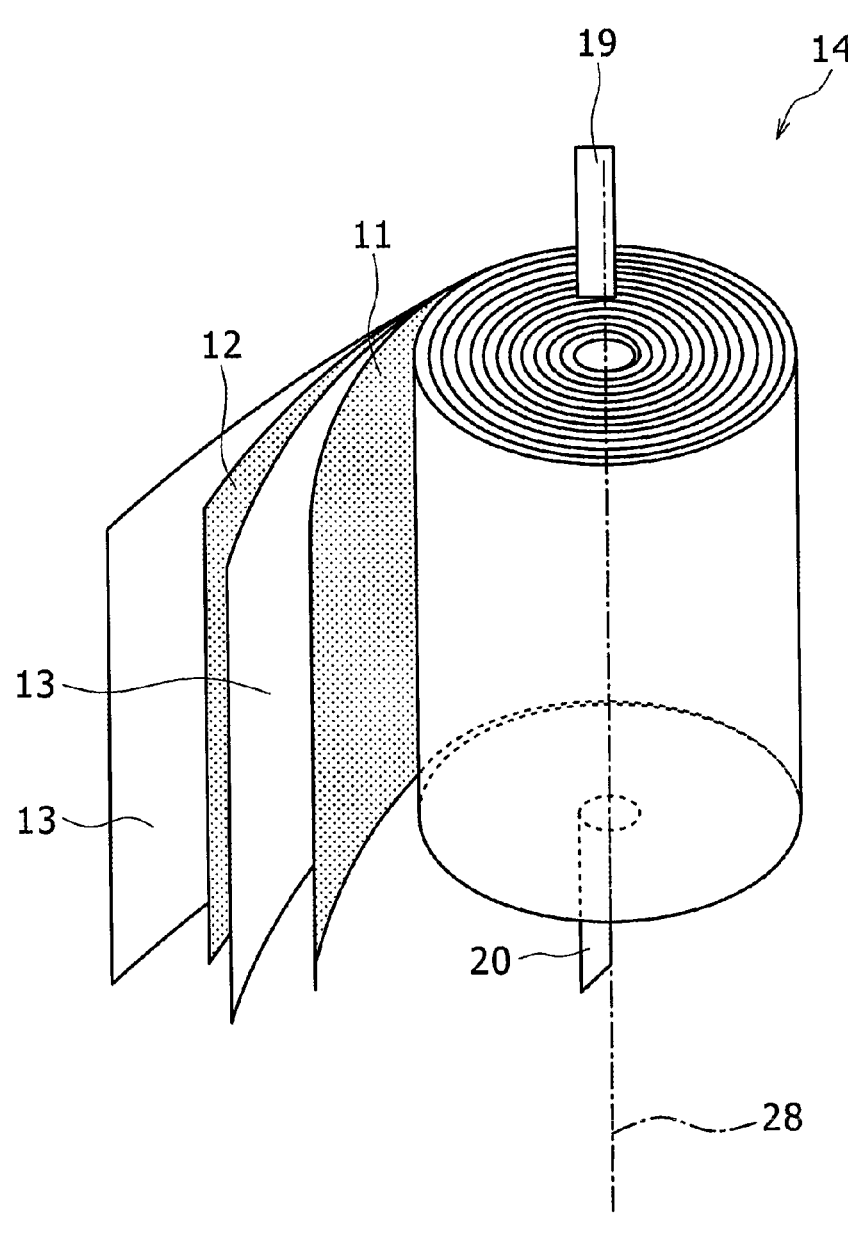
FIG. 2 is a perspective view of a wound electrode assembly comprised in the secondary battery illustrated in FIG. 1.

Next, the electrode assembly 14 will be described with reference to FIG. 2. FIG. 2 is a perspective view of the electrode assembly 14. As described above, the electrode assembly 14 has a wound structure in which the positive electrode 11 and the negative electrode 12 are spirally wound with the separator 13 interposed therebetween. Any of the positive electrode 11, the negative electrode 12, and the separator 13 is formed in a band shaped, and spirally wound around a winding core disposed along a winding axis 28 to be alternately stacked in the radial direction of the electrode assembly 14. In the radial direction, the winding axis 28 side is referred to as the inner peripheral side, and the opposite side is referred to as the outer peripheral side. In the electrode assembly 14, the longitudinal direction of the positive electrode 11 and the negative electrode 12 becomes a winding direction, and the width direction of the positive electrode 11 and the negative electrode 12 becomes an axial direction. The positive electrode lead 19 extends, on the upper end of the electrode assembly 14 toward the axial direction, from a substantial center between the center and the outermost circumference in the radial direction. The negative electrode lead 20 extends, on the lower end of the electrode assembly 14, toward the axial direction from near the winding axis 28.

For the separator 13, a porous sheet having an ion permeation property and an insulation property is used. Specific examples of the porous sheet include a fine porous thin film, a woven fabric, and a nonwoven fabric. As a material of the separator 13, an olefin resin such as polyethylene and polypropylene is preferable. A thickness of the separator 13 is, for example, 10 μm to 50 μm. The separator 13 has tended to be thinned as higher capacity and higher output of the battery. The separator 13 has a melting point of, for example, approximately 130° C. to 180° C.

Figure 5:
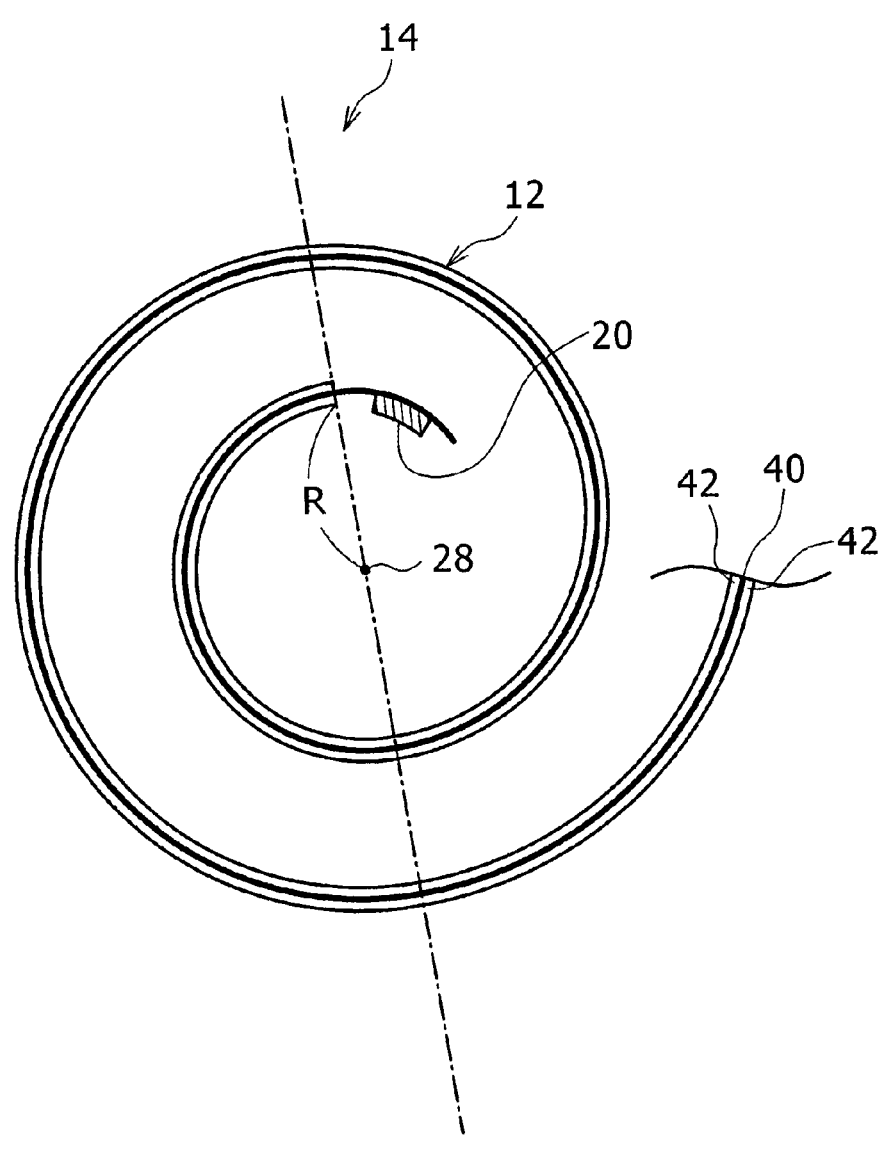
FIG. 5 is a radial sectional view of the negative electrode near the winding axis of the electrode assembly of an example of an embodiment.

Next, an embodiment with an ununiform content rate of the binder in the negative electrode mixture layer 42 in the longitudinal direction will be described with reference to FIGS. 3 to 5. FIG. 3 is a front view of the positive electrode 11 and negative electrode 12 constituting the electrode assembly 14. In FIG. 3, the positive electrode 11 and the negative electrode 12 are illustrated with an unwound state. As exemplified in FIG. 3, the negative electrode 12 is formed to be larger than the positive electrode 11 to prevent precipitation of lithium on the negative electrode 12 in the electrode assembly 14. In specific, a length in the width direction (axial direction) of the negative electrode 12 is larger than a length in the width direction of the positive electrode 11. In addition, a length in the longitudinal direction of the negative electrode 12 is larger than a length in the longitudinal direction of the positive electrode 11. As a result, at least a portion on which the positive electrode mixture layer 32 of the positive electrode 11 is formed is disposed opposite to a portion on which negative electrode mixture layer 42 of the negative electrode 12 is formed with the separator 13 interposed therebetween when wound as the electrode assembly 14.

The positive electrode 11 has the band-shaped positive electrode current collector 30 and the positive electrode mixture layer 32 formed on the positive electrode current collector 30. The positive electrode mixture layer 32 is formed on at least one of the inner peripheral side and outer peripheral side of the positive electrode current collector 30. For the positive electrode current collector 30, a foil of a metal, such as aluminum, a film in which such a metal is disposed on a surface layer thereof, and the like are used, for example. A preferable positive electrode current collector 30 is an aluminum foil or an alloy foil manly composed of aluminum. A thickness of the positive electrode current collector 30 is, for example, 10 $\mu$n to 30 $\mu$m.

The positive electrode mixture layer 32 is preferably formed on an entire region of both surfaces of the positive electrode current collector 30 except for a positive electrode exposed part 34, described later. The positive electrode mixture layer 32 preferably includes a positive electrode active material, a conductive agent, and a binder. The positive electrode mixture layer 32 is formed by applying a positive electrode mixture slurry including the positive electrode active material, the conductive agent, the binder, and a solvent such as N-methyl-2-pyrrolidone (NMP) on the both surfaces of the positive electrode current collector 30 to be dried (positive electrode mixture layer forming step). Then, the positive electrode mixture layer 32 is compressed.

Examples of the positive electrode active material may include a lithium-containing transition metal oxide containing a transition metal element such as Co, Mn, and Ni. The lithium-containing transition metal oxide is not particularly limited, and preferably a composite oxide represented by the general formula $Li_{1+x}MO_2$ (in the formula, $-0.2<x\leq0.2$ and M includes at least one of the group consisting of Ni, Co, Mn, and Al).

Examples of the conductive agent included in the positive electrode mixture layer 32 may include carbon materials such as carbon black (CB), acetylene black (AB), Ketjenblack, and graphite.

Examples of the binder included in the positive electrode mixture layer 32 include fluororesins such as polytetrafluoroethylene (PTFE) and polyvinylidene fluoride (PVdF), polyacrylonitrile (PAN), a polyimide (PI), an acrylic resin, and a polyolefin resin. When the positive electrode mixture slurry is prepared in an aqueous solvent, styrene-butadiene rubber (SBR), nitrile rubber (NBR), CMC or a salt thereof, polyacrylic acid or a salt thereof, polyvinyl alcohol, and the like may be used. The binder is preferably a rubber resin having a repeating molecular structure of double bonds and single bonds, such as SBR and NBR, from a viewpoint of flexibility of the positive electrode 11. These materials may be used singly, and may be used in combination of two or more thereof. A content rate of the binder in the positive electrode mixture layer 32 is 0.5 mass % to 10 mass %, and preferably 1 mass % to 5 mass %.

On the positive electrode 11, the positive electrode exposed part 34 in which a surface of the positive electrode current collector 30 is exposed is provided. The positive electrode exposed part 34 is a portion to which the positive electrode lead 19 is connected and a portion in which a surface of the positive electrode current collector 30 is uncovered with the positive electrode mixture layer 32. The positive electrode exposed part 34 is more widely formed in the longitudinal direction than the positive electrode lead 19. The positive electrode exposed part 34 is preferably provided on both surfaces of the positive electrode 11 to be stacked in the thickness direction of the positive electrode 11. The positive electrode lead 19 is bonded to the positive electrode exposed part 34 with, for example, ultrasonic welding.

In the example illustrated in FIG. 3, the positive electrode exposed part 34 is provided on a central part in the longitudinal direction of the positive electrode 11 and over an entire length in the width direction. The positive electrode exposed part 34 may be formed on the initial end part or terminal end part of the positive electrode 11, and is preferably provided at a position of substantially same distance from the initial end part and the terminal end part from a viewpoint of current collectability. The positive electrode lead 19 connected to the positive electrode exposed part 34 provided at such a position allows the positive electrode lead 19 to be disposed to project upward from the end surface in the width direction at a medial position in the radial direction of the electrode assembly 14 when wounded as the electrode assembly 14. The positive electrode exposed part 34 is provided by, for example, intermittent application in which the positive electrode mixture slurry is not applied on a part of the positive electrode current collector 30.

The negative electrode 12 has the band-shaped negative electrode current collector 40 and the negative electrode mixture layer 42 formed on both surfaces of the negative electrode current collector 40. For the negative electrode current collector 40, a foil of a metal such as copper, a film in which a metal such as copper is disposed on a surface layer thereof, and the like are used, for example. A thickness of the negative electrode current collector 40 is, for example, 5 $\mu$m to 30 $\mu$m.

The negative electrode mixture layer 42 is preferably formed on an entire region of the both surfaces of the negative electrode current collector 40 except for a negative electrode exposed part 44, described later. The negative electrode mixture layer 42 preferably includes a negative electrode active material and a binder. The negative electrode mixture layer 42 is formed by applying a negative electrode mixture slurry including the negative electrode active material, the binder, and a solvent such as water on the both surfaces of the negative electrode current collector 40 to be dried (negative electrode mixture layer forming step). Then, the negative electrode mixture layer 42 is compressed.

In the example illustrated in FIG. 3, the negative electrode exposed part 44 is provided on the initial end part in the longitudinal direction of the negative electrode 12 and over an entire length in the width direction of the current collector. The negative electrode exposed part 44 is a portion to which the negative electrode lead 20 is connected and a portion in which a surface of the negative electrode current collector 40 is uncovered with the negative electrode mixture layer 42. The negative electrode exposed part 44 is more widely formed in the longitudinal direction than a width of the negative electrode lead 20. The negative electrode exposed part 44 is preferably provided on both surfaces of the negative electrode 12 to be stacked in the thickness direction of the negative electrode 12.

In the present embodiment, the negative electrode lead 20 is bonded to a surface on the inner peripheral side of the negative electrode current collector 40 with, for example, ultrasonic welding. One end of the negative electrode lead 20 is disposed on the negative electrode exposed part 44, and the other end extends downward from the lower end of the negative electrode exposed part 44.

The position of the negative electrode lead 20 to be disposed is not limited to the example illustrated in FIG. 3, and the negative electrode lead 20 may be provided only on the terminal end part of the negative electrode 12. Alternatively, the negative electrode lead 20 may be provided on the initial end part and terminal end part of the negative electrode 12. In this case, a current collectability is improved. The terminal end part of the negative electrode 12 may be electrically connected to the exterior housing body 15 without using the negative electrode lead 20 by contacting the negative electrode exposed part 44 on the terminal end part of the negative electrode 12 with the inner peripheral face of the exterior housing body 15 (see FIG. 1). The negative electrode exposed part 44 is provided by, for example, intermittent application in which the negative electrode mixture slurry is not applied on a part of the negative electrode current collector 40.

The negative electrode active material is not particularly limited as long as it may reversibly occlude and release lithium ions, and for example, carbon materials such as natural graphite and artificial graphite, metals that form an alloy with lithium such as Si and Sn, or an alloy or oxide including them may be used.

Examples of the binder included in the negative electrode mixture layer 42 include fluororesins such as polytetrafluoroethylene (PTFE) and polyvinylidene fluoride (PVdF), polyacrylonitrile (PAN), a polyimide (PI), an acrylic resin, and a polyolefin resin. When the negative electrode mixture slurry is prepared in an aqueous solvent, styrene-butadiene rubber (SBR), nitrile rubber (NBR), CMC or a salt thereof, polyacrylic acid or a salt thereof, polyvinyl alcohol, and the like may be used. The binder is preferably a rubber resin having a repeating molecular structure of double bonds and single bonds, such as SBR and NBR, from a viewpoint of flexibility of the negative electrode 12. These materials may be used singly, and may be used in combination of two or more thereof. A content rate of the binder in the negative electrode mixture layer 42 is 0.5 mass % to 10 mass %, and preferably 1 mass % to 5 mass %.

In FIG. 3, the initial end part 42*a* of the negative electrode mixture layer 42 is a portion adjacent to the negative electrode exposed part 44. Meanwhile, the terminal end part 42*b* of the negative electrode mixture layer 42 is identical to the terminal end part of the negative electrode 12. The negative electrode mixture layer 42 is continuously present from the initial end part 42*a* to the terminal end part 42*b*.

Next, a change in the content rate of the binder included in the negative electrode mixture layer 42 in the longitudinal direction of FIG. 3 will be described with reference to FIGS. 4(*a*) to 4(*d*). In FIG. 4(*a*), the content rate of the binder decreases at a constant rate from the initial end part to the terminal end part. In other words, the initial end part 42*a*, which is likely to generate cracking and peeling of the negative electrode mixture layer 42, has a higher content rate of the binder, and the terminal end part 42*b*, which is unlikely to generate cracking and peeling as a larger winding radius than the initial end part 42*a*, has a lower content rate of the binder. Such a constitution can prevent an increase in the internal resistance of the battery due to the binder included in the negative electrode mixture layer 42, and also can prevent cracking and peeling of the negative electrode mixture layer 42.

As indicated in FIG. 4(*b*), a gradient indicating the decreasing rate of the content rate of the binder from the initial end part 42*a* to the terminal end part 42*b* may not constant and may change in midstream. In FIG. 4(*c*), the content rate of the binder decreases from the initial end part 42*a* to the terminal end part 42*b*, and the content rate of the binder is constant between the initial end part 42*a* and terminal end part 42*b*. In FIG. 4(*d*), the content rate of the binder decreases from the initial end part 42*a* to the terminal end part 42*b*, and the content rate of the binder is constant near the initial end part 42*a*. Similarly, the content rate of the binder may be constant near the terminal end part 42*b* as long as the content rate of the binder decreases from the initial end part 42*a* to the terminal end part 42*b*. As indicated in FIGS. 4(*c*) and 4(*d*), a region where the content rate of the binder continuously decreases from the initial end part 42*a* side to the terminal end part 42*b* side may be provided in at least a part of the negative electrode mixture layer 42. In this region, the content rate of the binder preferably decreases linearly, but may decrease nonlinearly. Such a constitution allows the content rate of the binder in the initial end part 42*a* of the negative electrode mixture layer 42 to be higher than the content rate of the binder in the terminal end part 42*b*. The binder whose content rate changes in the negative electrode mixture layer 42 is preferably the rubber resin.

Here, a method of forming the negative electrode mixture layer 42 in which the content rate of the binder changes from one of the initial end part 42*a* side and the terminal end part 42*b* side to the other will be described. For forming such a negative electrode mixture layer 42, a multilayer die coater is preferably used. Using the multilayer die coater enables to simultaneously apply a plurality of the negative electrode mixture slurries having different content rates of the binder on the negative electrode current collector 40 with regulating a ratio of amounts applied thereof. When the negative electrode mixture slurry is applied on the negative electrode current collector 40, the negative electrode current collector 40 moves relative to the multilayer die coater. Thus, applying the plurality of the negative electrode mixture slurries having different content rates of the binder on the negative electrode current collector 40 with changing the ratio of amounts applied thereof at a predetermined timing may form the region where the content rate of the binder changes from the initial end part 42*a* side to the terminal end part 42*b* side on any position of the negative electrode mixture layer 42. For example, a first negative electrode mixture slurry and a second negative electrode mixture slurry having a higher content rate of the binder than the first negative electrode mixture slurry are prepared. Then, the first and second negative electrode mixture slurries are applied using the multilayer die coater with increasing a ratio of amounts of the first negative electrode mixture slurry to the second negative electrode mixture slurry applied from the initial end part 42*a* to terminal end part 42*b* of the negative electrode current collector 40 to obtain the negative electrode mixture layer 42 having a profile indicated in FIG. 4(*a*).

The case described above is where the content rate of the binder in the initial end part 42*a* is higher than the content rate of the binder in the terminal end part 42*b* in the negative electrode mixture layer 42, but the content rate of the binder in the initial end part may be higher than the content rate of the binder in the terminal end part in the positive electrode mixture layer 32. In addition, the content rate of the binder in the initial end part may be deservedly higher than the content rate of the binder in the terminal end part in any of the positive electrode mixture layer 32 and the negative electrode mixture layer 42. As the positive electrode 11 illustrated in FIG. 3, the content rate of the binder in the initial end part is higher than the content rate of the binder in the terminal end part even when the mixture layer is separated to two or more portions with the exposed part. In at least a part of the mixture layer continued from the initial end part, a region where the content rate of the binder decreases from the initial end part side to the terminal end part side is preferably formed.

Next, the winding radius of the negative electrode 12 near the initial end part of the negative electrode mixture layer 42 will be described with reference to FIG. 5. FIG. 5 is a radial sectional view of the negative electrode 12 near the winding axis 28 of the electrode assembly 14 of an example of an embodiment. Description of the positive electrode 11 and the separator 13 is omitted in FIG. 5.

The winding radius of the innermost circumference of the negative electrode 12 in the electrode assembly 14 is, for example, 1 mm to 5 mm. The innermost circumference of the negative electrode 12 is a circumference portion initiated from the initial end of the negative electrode 12. The winding radius of the innermost circumference of the negative electrode 12 is specified with a distance R between the winding axis 28 and the negative electrode 12. A smaller R is preferable for increasing the capacity of the secondary battery 10, but cracking and peeling tend to occur on the negative electrode mixture layer 42. In contrast, the present disclosure prevents such cracking and peeling on the negative electrode mixture layer 42; thereby the R is preferably 1 mm to 5 mm. Such a constitution allows the secondary battery 10 to have a high capacity. The winding radius of the innermost circumference of the negative electrode 12 may be regulated with a radius of the winding core used for winding the positive electrode 11, the negative electrode 12, and the separator 13.

EXAMPLES

The present disclosure will be further described below with Examples, but the present disclosure is not limited to these Examples.
[Production of Positive Electrode]

Mixing 95 parts by mass of $LiNi_{0.8}Co_{0.15}Al_{0.05}O_2$, 2.5 parts by mass of acetylene black (AB), and 2.5 parts by mass of polyvinylidene fluoride (PVdF) having an average molecular weight of 1.1 million was performed, and an appropriate amount of N-methyl-2-pyrrolidone (NMP) was added thereto to prepare a positive electrode mixture slurry with 70 mass % solid content. Then, this positive electrode mixture slurry was applied on both surfaces of a band-shaped positive electrode current collector made with an aluminum foil having a thickness of 15 μm, and the applied film was heated at 100° C. to 150° C. to be dried. The dried applied film was compressed with a roller and cut to a predetermined electrode size to produce a positive electrode in which a positive electrode mixture layer was formed on the both surfaces of the positive electrode current collector. A positive electrode exposed part where no mixture layer was present and the current collector surface was exposed was provided at a substantially central part in the longitudinal direction of the positive electrode, and a positive electrode lead made with aluminum was welded with the positive electrode exposed part.

[Production of Negative Electrode]

Mixing of 95 parts by mass of graphite, 5 parts by mass of SiO, 1 part by mass of carboxymethyl cellulose (CMC), and 0.8 parts by mass of styrene-butadiene rubber (SBR) was performed, and an appropriate amount of water was added thereto to prepare a first negative electrode mixture slurry. Separately, 95 parts by mass of graphite, 5 parts by mass of SiO, 1 part by mass of carboxymethyl cellulose (CMC), and 1.2 parts by mass of styrene-butadiene rubber (SBR) were mixed, and an appropriate amount of water was added thereto to prepare a second negative electrode mixture slurry. Then, the first negative electrode mixture slurry and the second negative electrode mixture slurry were set into a multilayer die coater to be applied similarly on both surfaces of a band-shaped negative electrode current collector made with a copper foil having a thickness of 8 μm with continuously changing a ratio of amounts of the first negative electrode mixture slurry to the second negative electrode mixture slurry applied from the initial end part to the terminal end part and from 0:1 to 1:0, and then the applied film was dried. The dried applied film was compressed by using a roller, and then cut to a predetermined electrode size to produce a positive electrode in which a negative electrode mixture layer was formed on the both surfaces of the negative electrode current collector. A negative electrode exposed part where no mixture layer was present on the initial end part and the current collector surface was exposed was provided, and a negative electrode lead made with nickel/cupper was welded with the negative electrode exposed part.
[Preparation of Electrolyte]

Into 100 parts by mass of a mixed solvent of ethylene carbonate (EC) and dimethyl carbonate (DMC) (EC: DMC=1:3 in a volume ratio), 5 parts by mass of vinylene carbonate (VC) was added. Into the above mixed solvent, $LiPF_6$ was dissolved so that a concentration was 1 mol/L to prepare an electrolyte.
[Production of Electrode Assembly]

The positive electrode and the negative electrode were wound with a separator made with polyethylene interposed therebetween around a winding core having a radius of 1 mm to produce an electrode assembly.
[Production of Cylindrical Secondary Battery]

Insulating plates were disposed on each upper and lower sides of the electrode assembly, and the electrode assembly was housed in an exterior housing body. Then, the negative electrode lead was welded with the bottom of the exterior housing body, and the positive electrode lead was welded with a sealing assembly. Thereafter, the electrolyte was injected inside the exterior housing body with a pressure reducing method, and then an opening end of the exterior housing body was sealed to be calked to the sealing assembly with a gasket interposed therebetween to produce a cylindrical secondary battery. A capacity of the produced battery was 2500 mAh.

Comparative Example 1

An electrode assembly and a battery were produced in the same manner as in Example except that the first negative electrode mixture slurry and the second negative electrode mixture slurry were not mixed, and only the first negative electrode mixture slurry was applied on the both surfaces of the negative electrode current collector.

Comparative Example 2

An electrode assembly and a battery were produced in the same manner as in Example except that the first negative electrode mixture slurry and the second negative electrode mixture slurry were not mixed, and only the second negative electrode mixture slurry was applied on the both surfaces of the negative electrode current collector.

[Evaluation for Presence/Absence of Cracking on Negative Electrode Mixture Layer]

Each of the electrode assemblies of Example and Comparative Examples 1 and 2 was disassembled to unwind the negative electrode, and occurrence of cracking and peeling on the initial end part of the negative electrode mixture layer were visually checked.

[Measurement of Internal Resistance]

Each of the cylindrical secondary batteries of Example and Comparative Examples 1 and 2 was charged at a constant current of 120 mA until a battery voltage reached 4.2 V under a temperature condition of 25° C., and subsequently charged at a constant voltage of 4.2 V until a current value reached 8 mA. Then, an internal resistance of each battery at 1 kHz was measured with an AC four-terminal method.

Evaluation results of Example and Comparative Examples 1 and 2 are shown in Table 1.

TABLE 1

|  | Presence/Absence of Cracking | Internal Resistance |
|---|---|---|
| Example | Absence | 25 mΩ |
| Comparative Example 1 | Presence | 23 mΩ |
| Comparative Example 2 | Absence | 37 mΩ |

Example 2

In Comparative Example 1, which used only the first negative electrode mixture slurry having a lower content rate of the binder, the internal resistance of the battery was low but cracking occurred on the electrode assembly. Meanwhile, in Comparative Example 2, which used only the second negative electrode mixture slurry having a higher content rate of the binder, no cracking occurred on the electrode assembly but the internal resistance of the battery was significantly higher than the battery in Comparative Example 1. In contrast, in Example, which used both the first and second negative electrode mixture slurries, no cracking occurred on the electrode assembly and an increase in the internal resistance of the battery was prevented comparing with Comparative Example 1. From the results, it was confirmed that an increase in the internal resistance of the battery due to the binder used in the electrode is prevented and the cracking and peeling of the mixture layer are prevented by setting the content rate of the binder in the initial end part to be higher than the content rate of the binder in the terminal end part.

REFERENCE SIGNS LIST

10 Secondary battery, 11 Positive electrode, 12 Negative electrode, 13 Separator, 14 Electrode assembly, 15 Exterior housing body, 16 Sealing assembly, 17, 18 Insulating plate, 19 Positive electrode lead, 20 Negative electrode lead, 21 Grooved part, 22 Filter, 23 Lower vent member, 24 Insulating member, 25 Upper vent member, 26 Cap, 26a Opening, 27 Gasket, 28 Winding axis, 30 Positive electrode current collector, 32 Positive electrode mixture layer, 34 Positive electrode exposed part, 40 Negative electrode current collector, 42 Negative electrode mixture layer, 44 Negative electrode exposed part

The invention claimed is:

1. A non-aqueous electrolyte secondary battery, comprising:

a wound electrode assembly in which a band-shaped positive electrode and a band-shaped negative electrode are wound with a separator interposed therebetween; and an exterior housing body that houses the electrode assembly, wherein the positive electrode has: a positive electrode current collector; and a positive electrode mixture layer formed on the positive electrode current collector and including at least a positive electrode active material and a binder;

the negative electrode has: a negative electrode current collector; and a negative electrode mixture layer formed on the negative electrode current collector and including at least a negative electrode active material and a binder; and in a longitudinal direction of at least one of the band-shaped positive and negative electrodes, at least one of the positive electrode mixture layer and the negative electrode mixture layer has a higher content rate of the binder in an initial end part than a content rate of the binder in a terminal end part provided on a same side of the current collector, wherein the initial end part corresponds to a winding core end of the band-shaped electrode, the terminal end part corresponds to a winding outer end of the band-shaped electrode.

2. The non-aqueous electrolyte secondary battery according to claim 1, wherein at least one of the positive electrode mixture layer and the negative electrode mixture layer has a region where a content rate of the binder continuously decreases from the initial end part side to the terminal end part side.

3. The non-aqueous electrolyte secondary battery according to claim 1, wherein a winding radius of an innermost circumference of the negative electrode in the electrode assembly is 1 mm to 5 mm.

4. The non-aqueous electrolyte secondary battery according to claim 1, wherein a region where the content rate of the binder continuously decreases from an initial end part side to a terminal end part side is provided in at least a part of the negative mixture layer.

* * * * *